April 14, 1931.  H. J. BENNETT  1,800,196
TIRE GAUGE
Filed Oct. 12, 1927    3 Sheets-Sheet 1

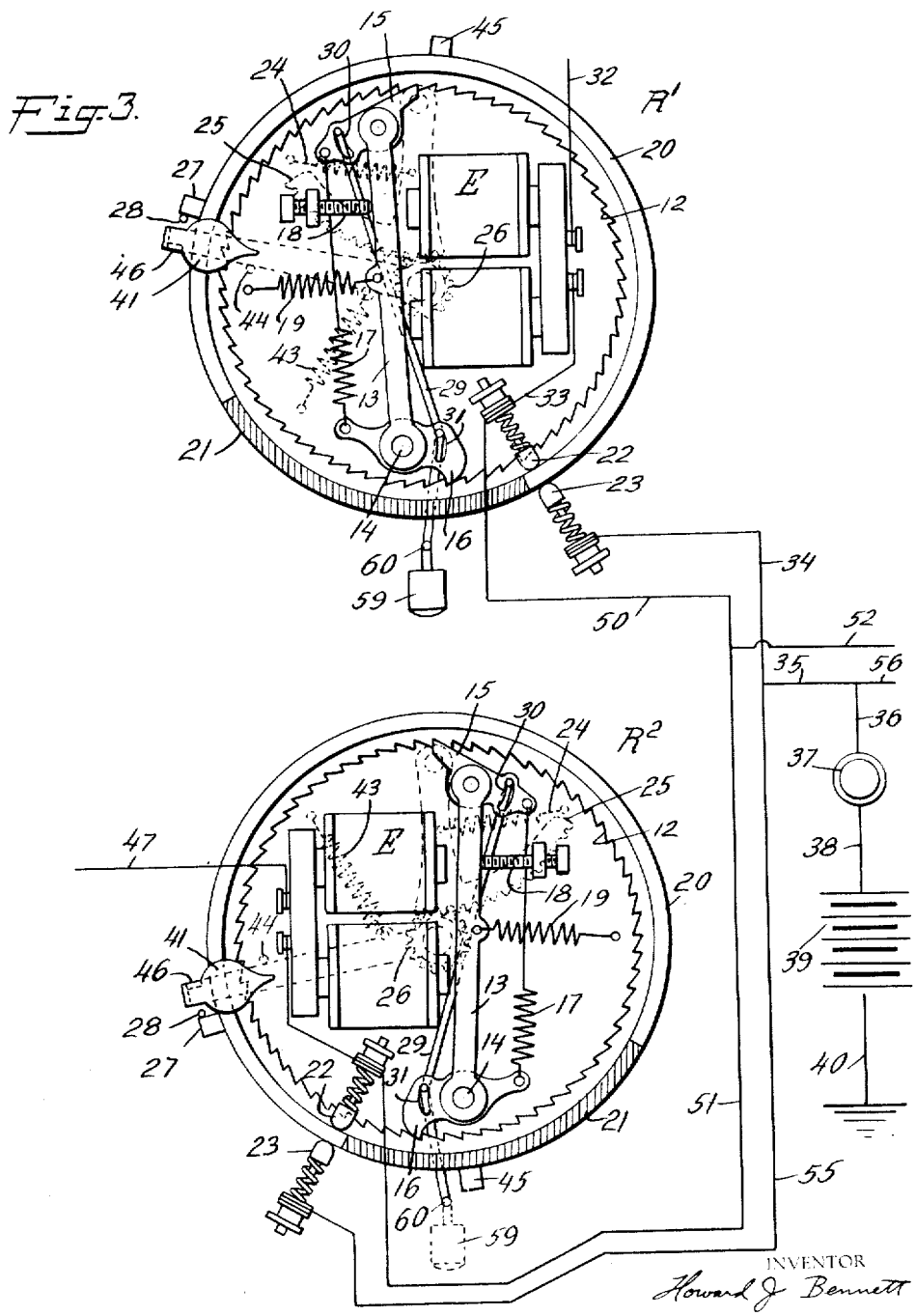

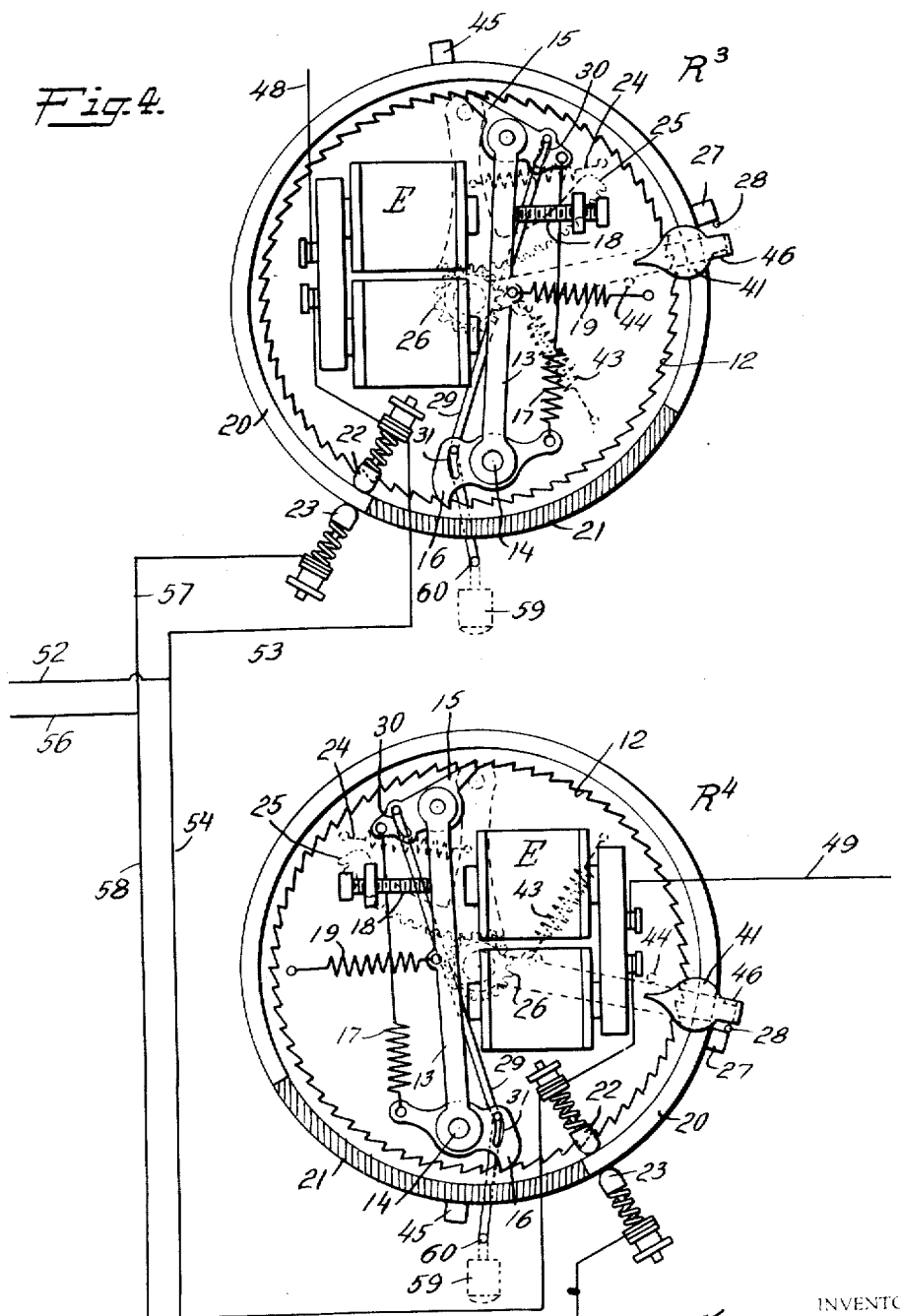

Patented Apr. 14, 1931

1,800,196

UNITED STATES PATENT OFFICE

HOWARD J. BENNETT, OF DENVER, COLORADO, ASSIGNOR, BY DIRECT AND MESNE ASSIGNMENTS, TO UNION TRUST COMPANY, OF DETROIT, MICHIGAN, AS TRUSTEE

TIRE GAUGE

Application filed October 12, 1927. Serial No. 225,648.

This invention relates to pressure indicating means for pneumatic vehicle tires, and more particularly concerns a device for automatically comparing the degree of inflation of the several tires of a vehicle while in motion.

Pneumatic vehicle tires, particularly as used on automobiles, are constructed and designed to be inflated to and maintained at predetermined pressures dependent upon the sizes thereof and the loads to be carried thereby. It has been found that the proper inflation of such tires is of great importance, as a tire which is run at a pressure below that for which it is designed wears out prematurely and is more susceptible to cuts, bruises, blowouts and other failures than is a properly inflated tire.

The matter of maintaining the tires of a vehicle at the proper pressure presents certain difficulties. After being inflated to the proper degree, the air slowly escapes from the tires through the valves or other minute openings and the pressures must be frequently tested and increased to maintain the proper inflation. The method ordinarily employed for checking the tire pressures necessitates stopping the vehicle and testing each tire separately, thereby inconveniencing the vehicle operator. For this reason, the checking of the tire pressures is frequently neglected for extended periods of time, and one or more of the tires is thus run at a pressure appreciably below that for which it is designed.

Due to this neglect of the tire pressures, the tires are frequently injured or weakened, and fail to give their normal amount of service. This neglect of tire pressures is particularly prevalent in connection with trucks, buses and other commercial vehicles which are operated by employees of the owners and considerable losses are sustained as a result of this practice.

With the above and other considerations in mind, it is proposed in accordance with the present invention to provide a device for automatically detecting and indicating to the vehicle operator the relative pressures of the various tires of a vehicle as compared to the hardest or best inflated tire thereon, and more specifically, it is proposed to provide a device of this character which is operated by the relative speeds of rotation of the several wheels of the vehicle.

It will be readily apparent that the speed of rotation of a vehicle wheel for a given vehicle speed depends upon the diameter of such wheel, and that variations in the inflation of a tire on a wheel varies the effective diameter thereof. Thus a wheel carrying a tire which is soft rotates at a higher speed than a wheel carrying a properly inflated tire. In the present invention, the angular speeds of the various wheels of a vehicle are compared to the angular speed of the slowest wheel, that is, a wheel carrying a tire which is inflated to the highest pressure, and in this manner, a soft or under-inflated tire can be quickly and easily located while the vehicle is in motion. Thus with the device of the present invention if one or more of the vehicle tires is at or near the required pressure, one or more soft tires may be readily located by comparison thereto.

Other specific objects, details and characteristic features of the present invention will become apparent as the description thereof progresses.

In describing the invention in detail, reference will be made to the accompanying drawings, in which:

Fig. 3 is a simplified and diagrammatic showing of the indicator operating mechanisms controlled by two of the vehicle wheels; and Fig. 4 is a view similar to Fig. 3, showing the indicator operating mechanisms controlled by the other two vehicle wheels.

As set forth above, the pressure indicating or comparing device of the present invention gives a comparison between the air pressures in the several tires by comparing the speeds of rotation of the several vehicle wheels. In general, the device comprises a plurality of movable elements or rings, each of which is turned an amount proportional to the rotation of one of the vehicle wheels, these rings being so arranged that they are started simultaneously and being provided respectively with indicators or pointers which indicate respectively an amount proportional to the extent by which the rotation of each wheel exceeds the rotation of the slowest wheel. The various elements of this mechanism will now be described in detail.

Figure 2:
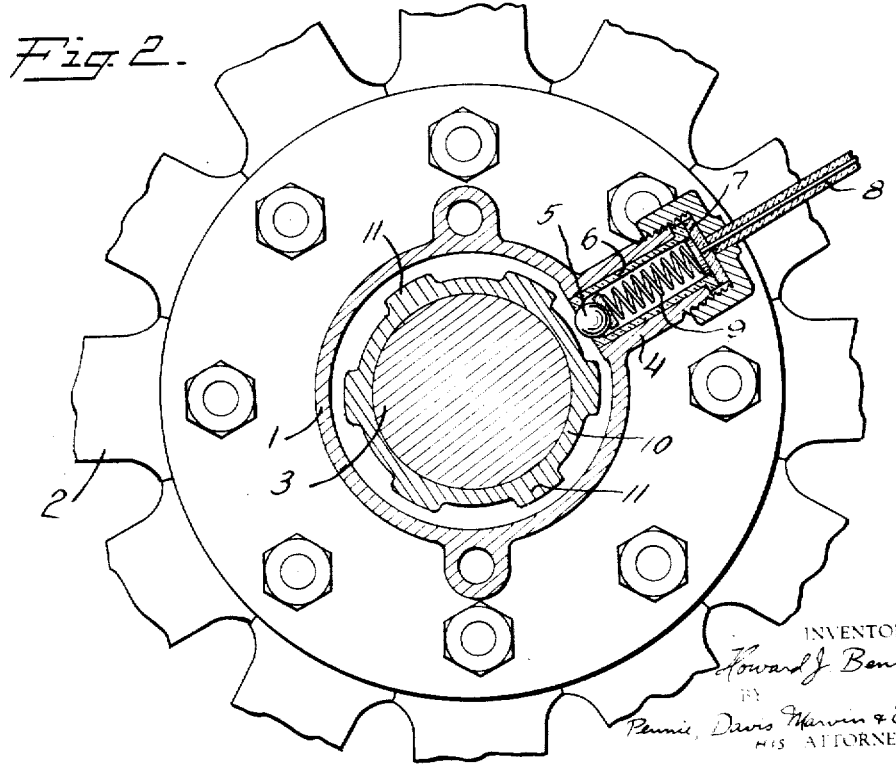
Fig. 2 is a side view, partially in section, of the electrical contact mechanism associated with each vehicle wheel.

Although the movable elements or rings of the indicator may be operated by the vehicle wheels in any suitable manner, as by a mechanical connection through reduction gearing, in the present embodiment of the invention, each of these rings is operated by an electro-magnet which is successively energized through contacts operated by the rotation of the corresponding wheel. In Fig. 2, one suitable form of wheel operated electrical contactor is shown, it being understood that a similar contact arrangement is to be employed on each of the vehicle wheels. The contact device disclosed comprises a stationary drum 1 which is suitably fixed to the brake drum, axle housing or other non-rotating part of the vehicle adjacent a wheel 2 thereof, and which surrounds the rotating axle or hub 3 of this wheel. The stationary drum 1 is provided with a tubular radial extension 4 carrying a spring pressed contact ball or brush 5 therein. As shown, the brush 5 is insulated from the drum 1 and the extension 4 by the tube 6 and the washer 7 of insulating material, and an insulated wire 8 is electrically connected with the brush 5 through a spring 9. The axle or hub 3 is provided with a collar or sleeve 10 carrying a plurality of equally spaced cams 11 on the peripheral surface thereof, which cams are arranged to successively make contact with the brush 5 as the wheel rotates, thereby electrically connecting the insulated wire 8 to the frame of the vehicle. In the embodiment shown, six equally spaced cams 11 are provided on the sleeve 10 so that for each revolution of the wheel 2, the wire 8 is grounded six successive times.

Referring now more particularly to Figs. 3 and 4, the means for operating the indicating device will be described. As generally explained above, the indicating means comprises a plurality of rings R, usually four in number, which are operated respectively in accordance with the rotation of each of the four vehicle wheels. In Figs. 3 and 4 of the drawings, these rings and their operating mechanisms have been shown separately, it being understood that they are normally co-axially arranged in stacked arrangement in suitable housings, not shown, and are suitably pivotally mounted to turn independently therein. As the various rings and their associated mechanism are substantially identical, only one such unit will be described in detail, the corresponding elements of the remaining units being designated by like reference characters.

Referring to the ring $R^1$ shown in the upper portion of Fig. 3, the ring proper is provided with a set of inwardly extending ratchet teeth 12. An armature lever 13 is pivotally mounted on a fixed stud 14 within the ring $R^1$, and carries a pivoted ratchet pawl 15 on the free end thereof, this pawl being arranged to engage the teeth 12 as shown. A stop pawl 16 is pivoted on the stud 14, and a tensioned spring 17 is connected between the pawls 15 and 16 to provide a resilient engagement between the pawls and the ring teeth 12. The armature lever 13 is normally held against an adjustable stop 18 by means of a spring 19, and an electro-magnet E is provided, being arranged when energized to attract the lever 13 and so move the ring $R^1$ in a clock-wise direction through an angular distance corresponding to one of the teeth 12.

A contact rim is provided at the edge of the ring $R^1$, and comprises a metallic segment 20 and an insulating segment 21. The metallic segment 20 extends around substantially three-quarters of the circumference of the ring $R^1$ and completes an electrical circuit between two spring pressed stationary contacts 22 and 23 while the ring turns through three-quarters of a revolution, after which the insulating segment 21 electrically isolates these contacts and breaks the circuit therebetween.

The ring $R^1$ is normally biased in a counter clock-wise direction by a spring 24 which applies this bias to the ring through a pivoted sector 25 and a pinion 26 secured to the shaft of the ring. A radially extending lug 27 is fixed to the periphery of the ring $R^1$ and normally engages a fixed stop 28 to determine the initial position of the ring. A release rod 29 is provided, having portions extending through arcuate slots 30 and 31 in the pawls 15 and 16 respectively. It will be apparent from a study of the drawings that an upward movement of the rod 29 releases both the ratchet pawl 15 and the stop pawl 16 from the ring teeth 12, and thereby permits the ring $R^1$ to be returned in a counter clock-wise direction by the spring 24 to its initial position with the lug 27 in engagement with the stop 28.

The electro-magnet E of the ring $R^1$ is energized through a circuit including the wire 32, connected to the wire 8 leading to the contact device of one of the vehicle wheels, in this case assumed to be the left front wheel of the vehicle. The circuit is completed through the wire 33, stationary contact 22, conducting segment 20 of the ring $R^1$, stationary contact 23, wires 34, 35 and 36, manually operable switch 37, wire 38, battery 39, and wire 40 which is grounded to the frame of the vehicle. Thus when the switch 37 is closed and one of the cams 11 on the left front wheel contactor engages the brush 5 thereof the electro-magnet E of the ring $R^1$ is energized, attracting its armature lever 13 and moving the ring $R^1$ in a clock-wise direction through an angle of rotation corresponding to one of the ring teeth 12. As described above, each hub or axle 3 of the vehicle is provided with a sleeve 10 carrying six equally spaced contact cams 11 thereon, so that for each revolution of the wheel, the ring $R^1$ is moved a distance corresponding to six of the teeth 12. The ratchet teeth 12 are so proportioned and arranged that the number of teeth carried on three-quarters of the ring is an even multiple of the number of cams 11 carried by the hub or axle 3. For example, six cams 11 have been shown on the hub 3, and ninety-six teeth may be provided on three-quarters of the ring $R^1$. In this case, when the wheel makes exactly sixteen revolutions, the ring $R^1$ will have been turned through just three-quarters of a complete revolution. After the ring $R^1$ has been so turned, the stationary contacts 22 and 23 are electrically isolated by the insulating segment 21, and the circuit to the magnet E is broken unless this circuit is still completed through the contacts 22 and 23 of one of the other rings as hereinafter described.

Figure 1:
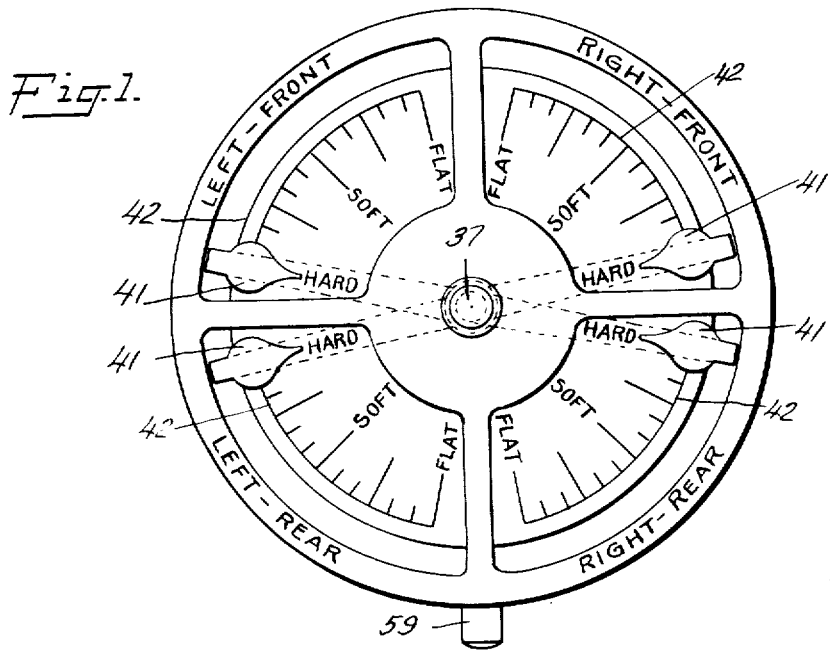
Figure 1 is a front elevation of the tire pressure indicator of the present invention.

A pointer 41 is provided in connection with each of the rings, being journalled coaxially with the ring and having an indicating portion extending over a dial 42 mounted in front of the rings as shown in Fig. 1. The pointers 41 of the rings $R^1$ and $R^4$ are biased by springs 43 in a counter clock-wise direction against stop lugs 44, whereas the pointers 41 of the rings $R^2$ and $R^3$ are biased clock-wise against their stop lugs. A radial lug 45 is fixed to each ring and is arranged to cooperate with a lug 46 on the corresponding pointer 41, the lugs 46 on the various pointers being disposed in different planes so as to be engaged only by the lugs 45 on the corresponding rings.

As shown in the drawings, the rings $R^1$ and $R^4$ are arranged to be turned in a clock-wise direction by their operating mechanisms, whereas the rings $R^2$ and $R^3$ have their operating mechanisms arranged to give counter clock-wise rotation thereto. This difference in direction of rotation of two pairs of rings is accomplished by merely reversing the operating mechanisms thereof and by providing oppositely disposed rachet teeth 12 thereon as will be readily understood from a study of the drawings.

The wires 47, 48 and 49 from the electro-magnets E of the rings $R^2$, $R^3$ and $R^4$ are connected respectively to the contact mechanisms of the left rear wheel, the right front wheel and the right rear wheel of the vehicle, so that each ring is operated in accordance with the movement of one of the vehicle wheels. All of the inner stationary contacts 22 of the four rings are electrically connected by the wires 50, 51, 52, 53 and 54, and the outer stationary contacts 23 are also connected by the wires 34, 55, 35, 56, 57 and 58. The outer stationary contacts 23 are also all connected to the switch 37 which is located at some point convenient to the vehicle operator, as for example, at the center of the indicating dial 42. Thus it will be seen that as long as one or more of the rings R is in such a position that its contacts 22 and 23 are connected by its conducting segment 20, the electro-magnets E of all of the rings will be periodically energized through their respective wheel contacts.

The release bars 29 of the four rings are preferably suitably arranged to be operated by a suitable button or handle 59, which may be connected to the several rods by a cross rod 60.

The operation of the device of the present invention will now be described. When the operator wishes to compare the pressures of the four tires of the vehicle, he first presses the release button 59 on the instrument, thus releasing the pawls 15 and 16 and permitting all of the rings R to be moved to their initial positions by the springs 24. The switch 37 is then closed, thus simultaneously energizing the electro-magnets E of all of the rings through their respective wheel contacts. As the wheels rotate, the four rings are moved in one direction or another at the rate of six rachet teeth per rotation of the associated vehicle wheel.

If all of the tires are at exactly the same pressure, all of the vehicle wheels rotate at the same speed and the rings are moved through three-quarters of one revolution, after which all of the contacts 22 and 23 are simultaneously electrically isolated by the insulating segments 21 and all of the rings stop with the lugs 45 thereof just in contact with the pointer lugs 46. The pointers are thus retained in their initial positions as shown in Fig. 1, all of these pointers registering "Hard" whereby the vehicle operator is informed that all of the tires carry the same pressure.

Assume now that one of the tires, say the left front tire, has been leaking and is slightly softer than the other three, and that the indicator is initiated to test the tires as described above. In this case, the left front wheel rotates at a higher speed than the other three wheels, and the corresponding ring $R^1$ is therefore turned by its electro-magnet E and ratchet mechanism at a higher speed than are the other three rings $R^2$, $R^3$ and $R^4$. After the ring $R^1$ has turned through three-quarters of a revolution and its lug 45 is in contact with the lug 46 of its pointer 41, the stationary contacts 22 and 23 of this ring are electrically isolated by the insulating segment 21, but as the contacts 22 and 23 of the remaining rings, R², R³ and R⁴, are still electrically connected, the electro-magnet E of the ring R¹ is still energized and this ring continues to turn, moving its pointer 41 in a clock-wise direction until all of the remaining three rings have completed three-quarters of a revolution and have opened their contacts 22 and 23. At this point all of the rings stop, and the pointer 41 of the ring R¹ indicates that the left front tire is either "Soft" or "Flat" depending on the amount by which the rotation of the left front wheel has exceeded the rotation of the other three wheels during the test period.

From the above description, it will be understood that a comparison of the pressures of any three soft tires relative to the hardest tire may be obtained. As the wheel carrying the hardest tire rotates at the slowest rate, the ring corresponding to this wheel is the last to complete three-quarters of a revolution and the energizing circuit for the electro-magnets E of all of the rings is maintained closed through the contacts 22 and 23 of this slowest ring until after the other three rings have been turned through more than three-quarters of a revolution and have so moved their respective pointers 41 to positions on the dial 42 which represent the degrees of inflation of these softer tires.

The arc through which the pointers 41 may move is arranged to be long enough so that when one tire is flat and another is fully inflated, the pointer corresponding to the flat tire will be moved from its initial position on the dial marked "Hard" to the point thereon marked "Flat". Consequently, the dial position gives an indication of the amount by which the pressure of each of the tires has fallen below that of the best inflated or hardest tire.

The tire gauge or pressure indicating device is easily attached to a motor vehicle without changes in the construction or arrangement of the running gear thereof. The device operates only when initiated by the operator and is hence not subjected to continuous wear. The indications of the tire pressures are given while the vehicle is in motion and in this manner the vehicle need not be taken out of service while the tire pressures are being checked up. Further, the tire pressures are checked without the usual loss of air therefrom which is occasioned by the use of pneumatic tire gauges. Since no pneumatic apparatus is employed, it is impossible for leaks to occur in the apparatus, and any failure thereof due to accidental injury or unauthorized tampering does not result in the deflation of the tires.

In general it may be stated that it is best to make the determination as to the condition of the tires when the vehicle is traveling on a comparatively smooth road, and the embodiment of the invention herein described in detail is intended to be in operation only when it is desired to make a determination of the condition of the tires. While making the determination it is desirable to avoid turning the vehicle for this would cause some of the wheels to travel further than others regardless of the pressure in the tires. In the event the tires have varying outside diameters, due to wear or to the fact that the tires are the product of various tire manufacturers and differ in size, it is desirable to calibrate the indicating device by noting the positions assumed by the pointers when the tires are known to be properly inflated. Thereafter a determination of the condition of the tires can be made by noting any variation from the calibrated or standard position of the pointers. It is desirable to avoid applying the brakes while the tire pressure determination is being made for unless the brakes are properly equalized there will be a tendency for the several wheels to travel unequaled distances regardless of the amount of air in the tires.

In the embodiment of the invention herein described in detail the mechanism is intended to operate only while the vehicle is traveling a relatively short distance corresponding with a limited number of revolutions of one of the vehicle wheels.

Although the present invention has been described in connection with a single specific arrangement of apparatus, it should be understood that the invention is not limited to the details of construction and arrangement shown. For example, various means other than those disclosed may be employed for comparing the speeds of rotation of the several wheels and for indicating the differences between these speeds, and many other changes, combinations or omissions may be made in the apparatus without departing from the scope of the invention as described by the appended claims.

I claim:

1. In a device for comparing the air pressures in pneumatic tires mounted on different wheels of a vehicle, a plurality of elements, means for moving each of said elements respectively an amount proportional to the rotation of one of the vehicle wheels, and means for indicating the relative position of said elements after an interval of travel of the vehicle.

2. In a device for comparing the air pressures in pneumatic tires mounted on different wheels of a vehicle responsive to the movement of said wheels, means on the vehicle for simultaneously comparing the speeds of rotation of the several vehicle wheels.

3. In a device for comparing the air pressures in pneumatic tires mounted on different wheels of a vehicle, means including elements independently driven in accordance with the rotation of the different vehicle wheels, and means for comparing the amount of movement of the several elements.

4. In a device for comparing the air pressures in pneumatic tires mounted on different wheels of a vehicle, a plurality of elements on the vehicle, means for moving each of said elements respectively an amount proportional to the rotation of one of the vehicle wheels, manually operable means for simultaneously initiating the movement of all of said elements, and means for indicating the relative movement thereof.

5. In a device for comparing the air pressures in pneumatic tires mounted on different wheels of a vehicle, a plurality of elements on a vehicle, means for moving each of said elements respectively at a rate proportional to the speed of rotation of one of the vehicle wheels, means for simultaneously initiating the movement of all of said elements, means for automatically stopping the movement of all of said elements after a predetermined movement of any one of said elements and means for indicating the difference in movement thereof.

6. In a device for comparing the air pressures in pneumatic tires mounted on different wheels of a vehicle, a plurality of elements on a vehicle, a plurality of independent operating means each controlled by the rotation of one of the vehicle wheels, and each moving one of said elements proportional to the rotation of one of the wheels, manually operable means for simultaneously initiating the operation of all of said operating means, and means governed by the slowest moving of said elements for simultaneously discontinuing the operation of all of said operating means.

7. In a device of the character described, in combination with a vehicle having a plurality of wheels each equipped with a pneumatic tire, a plurality of elements, means for moving said elements, an electric contact means on each of said wheels for controlling the movement of said elements respectively in accordance with the rotation of the several wheels and means operated by said elements for indicating the relative movement thereof and thereby indicating the relative pressures in the tires on the several wheels.

8. In a device of the character described, in combination with a vehicle having a plurality of wheels each equipped with a pneumatic tire, a plurality of elements, means for moving said elements, an electric contact means on each of said wheels for controlling the movement of said elements respectively in accordance with the rotation of the several wheels, manually operable means for simultaneously supplying electric energy to all of said elements through said contact means, and means operated by the slowest moving of said elements after it has moved a predetermined amount for simultaneously cutting off the supply of electric energy from all of said elements.

9. In a device of the character described, in combination with a vehicle having a plurality of wheels each equipped with a pneumatic tire, a plurality of elements each biased to an initial position, means for separately moving said elements from their initial positions distances proportional respectively to the travel of each of the several vehicle wheels, manually operable means for simultaneously initiating the movement of said elements, means operated by the slowest moving element after it has been moved a predetermined amount from its initial position for stopping the movement of all of said elements and means for indicating the difference in movement between the slowest moving element and the other elements, whereby a comparison between the pressures in said tires is obtained.

10. In a device of the character described, in combination with a vehicle having a plurality of wheels each equipped with a pneumatic tire, a plurality of elements each biased to an initial position, means for separately moving said elements from their initial positions distances proportional respectively to the travel of each of the several vehicle wheels, manually operable means for simultaneously initiating the movement of said elements, means operated by the slowest moving element after it has been moved a predetermined amount from its initial position for stopping the movement of all of said elements, means operated by said elements for indicating the difference in movement between said slowest moving elements and the other elements, and means for resetting said elements to their initial positions.

11. In a device of the character described, in combination with a vehicle having a plurality of wheels each equipped with a pneumatic tire, a plurality of elements each corresponding to one of the vehicle wheels, an electro-magnet for each of said elements, means cooperating with said electro-magnet for moving such element a predetermined amount when energized, means including wheel operated contacts for energizing each of said electro-magnets a predetermined number of times for each revolution of the corresponding vehicle wheel, means for cutting off the supply of energy from all of the electro-magnets when the slowest moving element has moved a predetermined amount, and indicating means operated by each of said elements for indicating the amount by which the movement of the several elements exceeds the movement of the slowest element, whereby the pressures of the several tires are individually compared with the pressure of the hardest tire.

12. In a device of the character described, the combination with a vehicle having a plurality of wheels each equipped with a pneumatic tire, of means responsive to the rotation of each of said wheels for indicating whether any one wheel is rotating faster than another of said wheels, said means being mounted on the vehicle.

13. In combination with a vehicle axle having pneumatically tired wheels arranged at opposite ends thereof, said axle permitting differential rotation of the wheels, a signal associated with each wheel, and means operated by each wheel for rendering the signals operative, said signals being arranged for simultaneous operation and comparative inspection and operating intermittently during operation of the wheels.

14. In combination with a vehicle axle having pneumatically tired wheels arranged at opposite ends thereof, said axle permitting differential rotation of the wheels, a switch intermittently operated by rotation of each wheel, the signalling element in circuit with each switch, said switches closing the circuits of their associated signalling elements at the same number of rotations of the associated wheels.

15. In combination with a vehicle axle having pneumatically tired wheels arranged at opposite ends thereof, said axle permitting differential rotation of the wheels, a signalling circuit associated with each wheel, and identical means operated by each wheel for periodically closing the associated signalling circuit.

In testimony whereof I affix my signature.

HOWARD J. BENNETT.

12. In a device of the character described, the combination with a vehicle having a plurality of wheels each equipped with a pneumatic tire, of means responsive to the rotation of each of said wheels for indicating whether any one wheel is rotating faster than another of said wheels, said means being mounted on the vehicle.

13. In combination with a vehicle axle having pneumatically tired wheels arranged at opposite ends thereof, said axle permitting differential rotation of the wheels, a signal associated with each wheel, and means operated by each wheel for rendering the signals operative, said signals being arranged for simultaneous operation and comparative inspection and operating intermittently during operation of the wheels.

14. In combination with a vehicle axle having pneumatically tired wheels arranged at opposite ends thereof, said axle permitting differential rotation of the wheels, a switch intermittently operated by rotation of each wheel, the signalling element in circuit with each switch, said switches closing the circuits of their associated signalling elements at the same number of rotations of the associated wheels.

15. In combination with a vehicle axle having pneumatically tired wheels arranged at opposite ends thereof, said axle permitting differential rotation of the wheels, a signalling circuit associated with each wheel, and identical means operated by each wheel for periodically closing the associated signalling circuit.

In testimony whereof I affix my signature.

HOWARD J. BENNETT.

CERTIFICATE OF CORRECTION.

Patent No. 1,800,196.    Granted April 14, 1931, to

HOWARD J. BENNETT.

It is hereby certified that error appears in the printed specification of the above numbered patent requiring correction as follows:   Page 4, lines 124 and 125, claim 2, strike out the words "responsive to the movement of said wheels" and insert the same to follow the syllable hicle" in line 126, of same claim; and that the said Letters Patent should be read with this correction therein that the same may conform to the record of the case in the Patent Office.

Signed and sealed this 2nd day of June, A. D. 1931.

(Seal)

M. J. Moore,
Acting Commissioner of Patents.

CERTIFICATE OF CORRECTION.

Patent No. 1,800,196.  Granted April 14, 1931, to

HOWARD J. BENNETT.

It is hereby certified that error appears in the printed specification of the above numbered patent requiring correction as follows: Page 4, lines 124 and 125, claim 2, strike out the words "responsive to the movement of said wheels" and insert the same to follow the syllable hicle" in line 126, of same claim; and that the said Letters Patent should be read with this correction therein that the same may conform to the record of the case in the Patent Office.

Signed and sealed this 2nd day of June, A. D. 1931.

(Seal)

M. J. Moore,
Acting Commissioner of Patents.